United States Patent [19]

Minter

[11] Patent Number: 5,295,577
[45] Date of Patent: Mar. 22, 1994

[54] STORAGE SYSTEM FOR COMPACT DISCS

[76] Inventor: Theodore M. Minter, 3887 Martin Luther King Dr., Cleveland, Ohio 44105

[21] Appl. No.: 37,928

[22] Filed: Mar. 26, 1993

[51] Int. Cl.⁵ .............................................. B65D 85/57
[52] U.S. Cl. ................................... 206/309; 206/311; 206/312; 206/444; 206/511; 402/77
[58] Field of Search ............... 206/309, 311, 312, 444, 206/472, 473, 509, 511; 312/9.47, 9.48, 9.58, 9.59; 281/27.1, 27.2; 402/70, 77, 502

[56] References Cited

U.S. PATENT DOCUMENTS

| | | | |
|---|---|---|---|
| 1,287,842 | 12/1918 | Betts | 402/77 |
| 1,303,299 | 5/1919 | Hahl | 206/309 |
| 1,336,293 | 4/1920 | Grammich | 206/309 |
| 3,109,539 | 11/1963 | Turoff | 206/309 |
| 4,538,730 | 9/1985 | Wu | 206/444 |
| 4,588,321 | 5/1986 | Egly | 206/473 |
| 4,676,374 | 6/1987 | Wilkins | 206/444 |
| 4,702,369 | 10/1987 | Philosophe | 206/312 |
| 4,750,611 | 6/1988 | Morrone | 206/45 |
| 4,778,047 | 10/1988 | Lay | 206/44 |
| 4,793,479 | 12/1988 | Otsuka et al. | 206/310 |
| 4,850,731 | 7/1989 | Youngs | 402/79 |
| 5,161,907 | 11/1992 | Byrne | 206/472 |
| 5,209,593 | 5/1993 | Ros | 402/77 |

FOREIGN PATENT DOCUMENTS 911192  7/1946  France .................... 206/309

*Primary Examiner*—David T. Fidei
*Attorney, Agent, or Firm*—David A. Burge

[57] ABSTRACT

An upwardly opening, generally rectangular tray for receiving and stacking therein at least one set of generally rectangular disc holders that define formations for receiving and releasably supporting compact discs. Cooperatively interactive guide formations are defined by the tray and by the disc holders 1) for permitting the disc holders to be moved relative to each other so that compact discs can be positioned in and selectively removed from the disc receiving formations of the holders, and 2 for facilitating the orderly stacking of the disc holders so that, when stacked, the disc holders extend juxtaposed one atop another with each disc holder extending substantially parallel to a bottom wall of the tray. An optional cover may be positioned atop an individual tray, or atop the uppermost of a set of stacked trays. Alternatively, a cover that is hinge-connected to the tray may be provided. Label mounting surfaces preferably are provided on the trays, on the disc holders and on the optional cover.

25 Claims, 10 Drawing Sheets

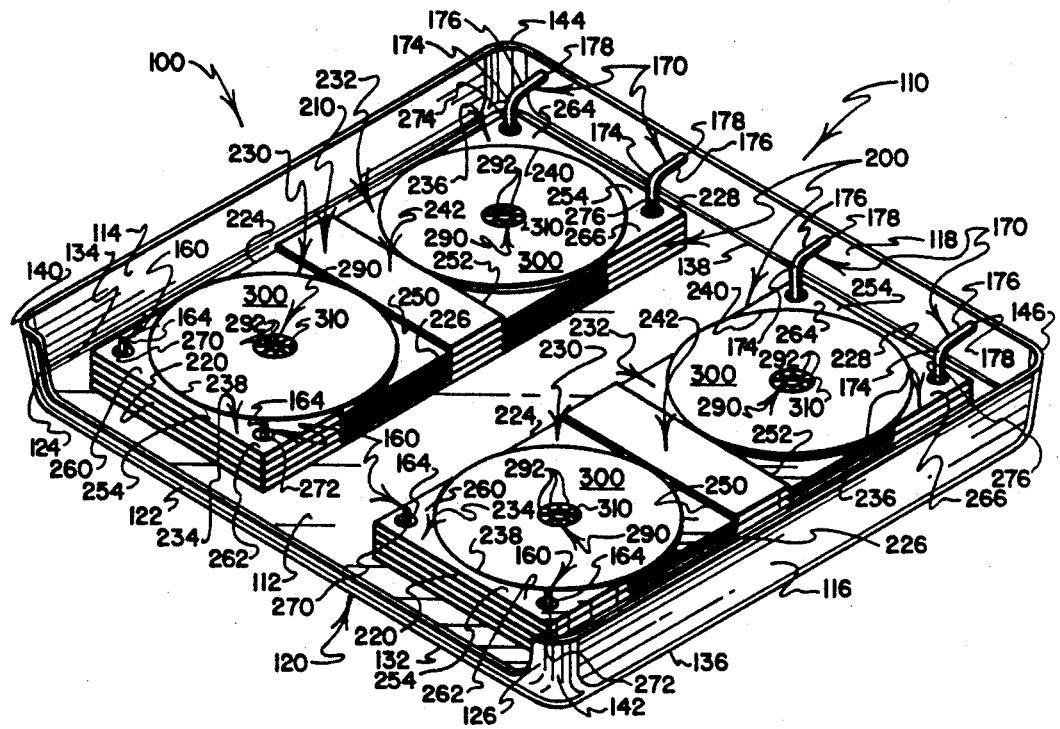

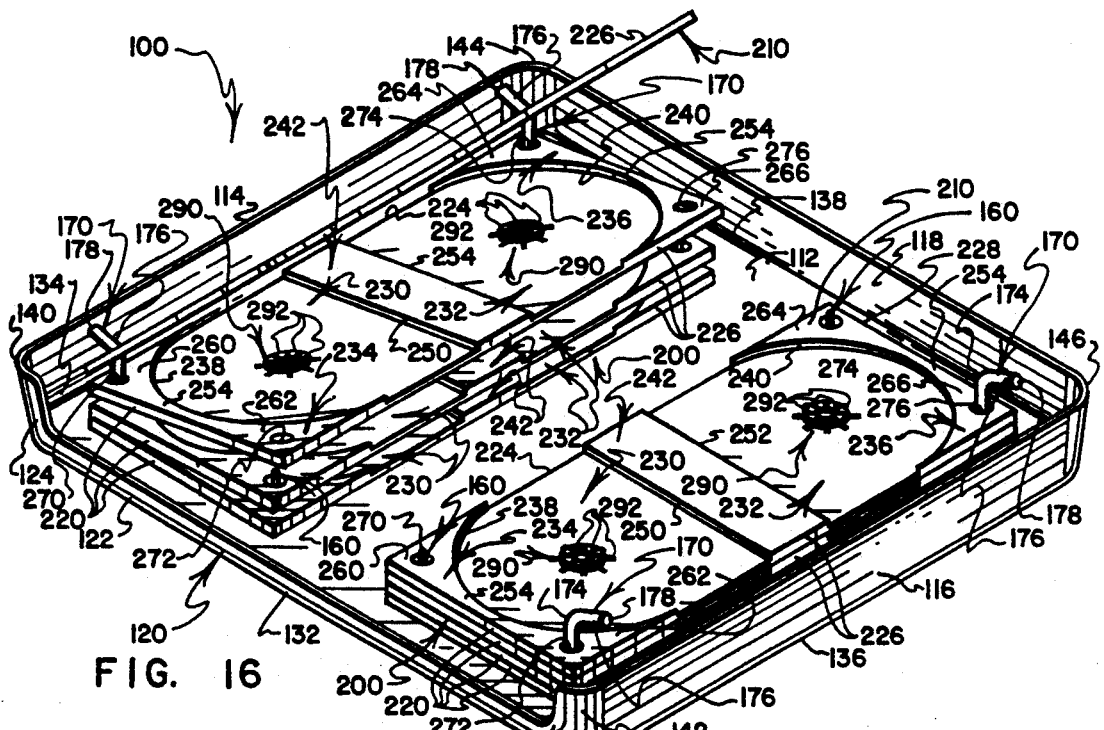
FIG. 16
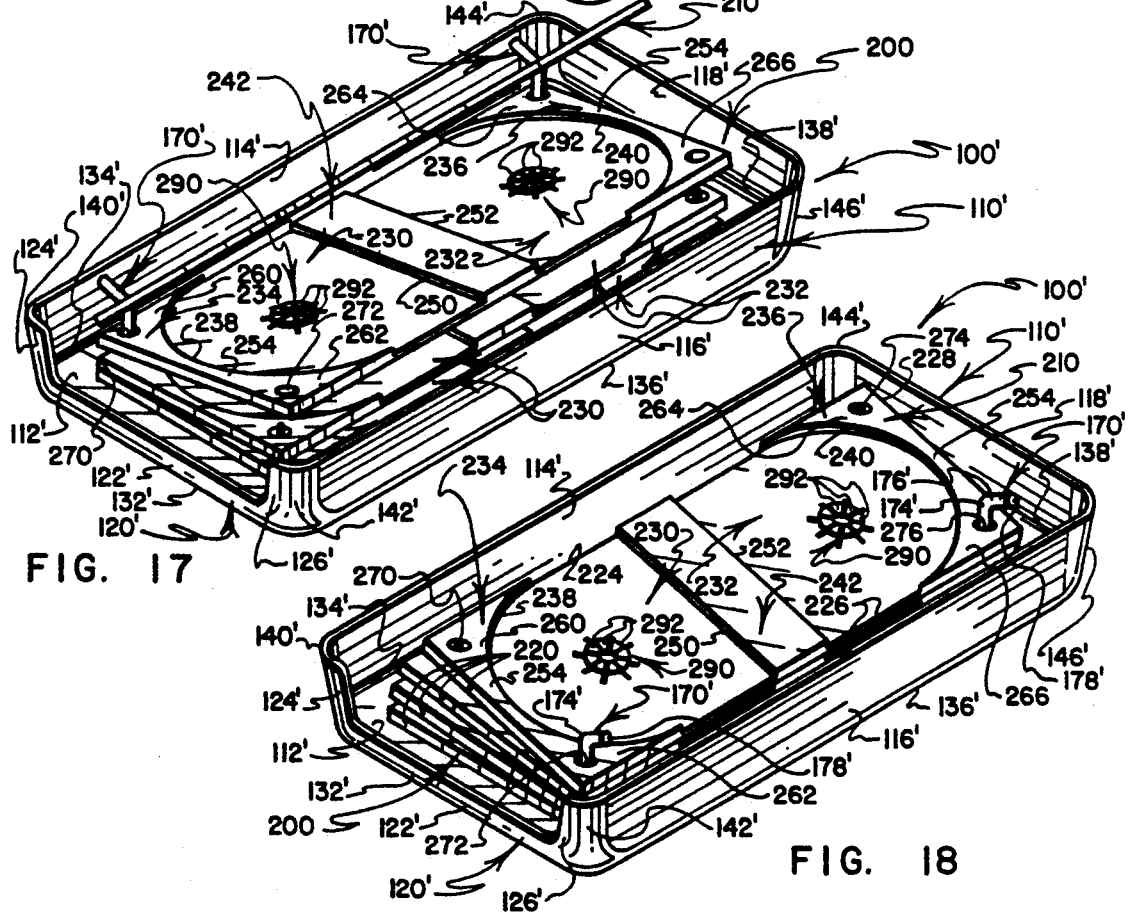
FIG. 17
FIG. 18

STORAGE SYSTEM FOR COMPACT DISCS

CROSS-REFERENCE TO RELATED APPLICATION

Reference is made to a companion design application filed (concurrently herewith) by Theodore M. Minter, Ser. No. 29/006,403, entitled TRAY WITH MOVABLE DUAL-DISC HOLDERS FOR USE IN STORING SETS OF COMPACT DISCS, the disclosure of which is incorporated herein by reference.

BACKGROUND OF THE INVENTION

1. Field of the Invention

The present invention relates generally to a system for effecting the orderly storage of a plurality of compact discs by utilizing one or more trays that each contain at least one set of stackable disc holders that define receiving formations for receiving and releasably retaining compact discs. More particularly, the present invention relates to the use of stackable compact disc holders carried in stackable trays, with each tray containing at least one set of stackable disc holders therein, and with each tray and its disc holders cooperatively defining interactive guide formations 1) for permitting the disc holders to be moved relative to each other so that compact discs can be inserted into and selectively removed from the disc receiving formations, and 2) for facilitating the orderly stacking of the disc holders within their associated trays.

2. Prior Art

A compact disc (commonly referred to as a "CD") is a recording medium from which recorded information can be read out or "played" by means of a laser beam. Each CD typically is formed as a disk-shaped plastic member having opposed, parallel side surfaces. One of the side surfaces contains a substantially continuous, generally helical groove or "record track," the configuration of which represents a sequence of digitally recorded data, with the data being encoded by utilizing minute variations in track cross-section. The "reading" or "playing" of a CD recording, or of selected portions thereof, is effected by directing a beam of laser light onto a small, selected portion of the record track while the disc is being rotated about the center axis of its "hub" hole to effectively move the laser beam along the record track, and by detecting and interpreting resulting reflections of the beam.

While CDs of various sizes and formats have been proposed, one "standard" has come to be quite widely accepted. This standard utilizes a plastic disc having a thickness of about 1.25 mm, a central diameter "hub" hole of about 15 mm, and an outer diameter of about 120 mm. The hub hole is used to center the disc for rotation, and the record track spirals helically inwardly from near the outer periphery of the disc toward the hub hole. By virtue of being among the first, this particular "standard" has gained wide initial acceptance, has become predominate in the CD marketplace of present day, and is expected to remain in wide use during years to come.

The CD "standard" described above was brought into existence principally for the purpose of providing a highly accurate means of recording and replaying audible subject matter such as voice and/or music. However, the same CD "standard" is rapidly gaining acceptance as a medium of choice for digitally recording a wide variety of information including visible subject matter such as photographs, sequential sets of video images and the like, and other forms of digitally recorded subject matter including programs and data that are meaningful to computers and so-called "multi-media" equipment. Some refer to CDs of this type that are used with computers by the term "CD-ROM," wherein "ROM" is an acronym for the term "read-only memory."

The computer-related uses being made of CDs that conform to the "standard" described above is increasing quite dramatically, especially in conjunction with multi-media systems, for a CD provides an excellent medium for digitally recording audio, video, programs, data and other forms of information, all of which can be utilized during the operation of multi-media equipment. Moreover, inasmuch as portions of the record track of a CD can be selectively "read" or "played back" as needed by multi-media computer equipment, the versatile uses to which CDs can be put in conjunction with the operation of multi-media systems is expected to dramatically increase the use that is made of CDs to an extent that is far beyond the scope of the use that would be made of this recording medium if it were utilized merely as a replacement for phonograph records for recording and playing voice and/or music.

An advantage that the use of CDs brings to computers is that the amount of program and data information that can be stored on a CD is substantially greater than that which can be stored on so-called "high density floppy diskettes" that are in present-day use. While a typical 3.5 inch high density diskette holds less than 1.5 mb of data, a typical CD can hold 600 mb of data, if not more. Thus, a single CD can be used in place of a relatively large number of computer diskettes to contain sizable computer programs and sizable banks of data, etc.

As CDs are increasingly coming into use both as a means for distributing computer programs and data, and as a means for providing information of a variety of types to multi-media capable computer equipment, the number of CDs that computer users have a need to store in a highly organized manner is increasing quite dramatically. Moreover, inasmuch as CDs that contain computer programs and data tend to be quite expensively priced and often are quite difficult to replace, a great deal of importance has come to be associated with the provision of a well organized, expansible, easy-to-use system for facilitating the storage and retrieval of CDs.

While a wide variety of proposals for storing CDs have been put forth, a number of drawbacks have been noted. Few proposals provide solid but lightweight tray-shaped structures that each carry stackable, relatively movable disc holders that permit a relatively large number of CDs to be securely, protectively stored while also permitting the stored CDs to be easily accessed and selectively removed, as needed. Few provide tray-shaped structures that can be stacked one atop another and/or individually supported to serve as drawer-like components of a multi-shelved piece of furniture. Few provide both tray-shaped structures and disc holders contained therein that each can be neatly labeled to facilitate the orderly storage and quick retrieval of CDs. Furthermore, few provide systems of tray-shaped structures containing disc holders that can have trays and/or disc holders that can have their storage capacities enhanced by simply adding identical trays and/or disc holders thereto as may be needed to systematically accommodate the steady acquisition of an increasing number of relatively expensive CDs—whereby substantially equally prompt access can be had to any CD that is stored by the system.

Just as the use that is made of CDs of the aforedescribed "standard" is expected to increase quite dramatically during coming years, there is expected to be a correspondingly significant increase in the degree of urgency that is associated with the yet unsatisfactorily answered need for the provision of a novel and improved system for facilitating the storage of CDs in a suitably organized fashion. Because the loss to a business that can be incurred if an important program-carrying or data-carrying CD has gone missing or cannot be located with ease can be so enormous and so detrimental, the importance of providing a high quality, easy-to-use CD storage and retrieval system that can be expanded as needed to consistently provide ready access to CDs that are securely, protectively stored in an organized manner when not in use is coming to pose a very serious need indeed.

SUMMARY OF THE INVENTION

The present invention addresses the previously described need by providing a novel and improved, highly versatile system for organizing, protectively storing and facilitating the selective retrieval of a plurality of CDs. At least one tray-shaped structure having a bottom wall and upstanding side walls is provided for carrying a plurality of generally rectangular-shaped holders for CDs, with each holder preferably defining a pair of disc-receiving formations for protectively receiving and releasably retaining a pair of CDs. Interactive guide formations are defined by each tray-shaped structure and by its associated disc holders 1) for permitting the disc holders to be moved relative to each other so that CDs can be inserted into and removed from the disc receiving formations of the disc holders, and 2) for facilitating the orderly stacking of the disc holders within their associated tray-shaped structures.

In preferred practice, a plurality of trays that are of substantially identical configuration are provided that can be stacked one atop another, or that can be supported individually on shelves of a suitably configured piece of furniture. The bottom wall of each of the trays preferably is substantially flat, and preferably provides smoothly curved formations for joining the periphery of the bottom wall with the upstanding side walls, with junctions between adjacent ones of the sidewalls also being defined by means of smoothly curved formations. By this arrangement, the bottom wall and the upstanding side walls cooperate to define an upwardly opening tray.

In preferred practice, the disc holders each preferably define a pair of side-by-side disc receiving formations, with each of these formations being capable of protectively receiving and releasably retaining a single compact disc. In their most preferred form, each of the disc holders is of generally rectangular shape, has a raised centrally located region that separates its disc receiving formations for carrying a label, and is provided with holes that extend through each of its corner regions for receiving guide formations that are carried by the associated tray.

In preferred practice, the guide formations that are provided 1) for permitting the disc holders to be moved relative to each other so that CDs can be positioned in and removed from the disc receiving formations that are defined by the disc holders, and 2) for facilitating the orderly stacking of the disc holders within their associated trays include pairs of hook-shaped formations that each are connected at one end to the bottom wall of the associated tray, and that extend through selected ones of the the aforementioned holes that preferably are formed through corner regions of the disc holders. The hook-shaped formations preferably each also have an upper portion that extends substantially horizontally toward a nearby side wall portion for cooperating with the bottom and side walls of the associated tray to retain a stack of disc holders in place in their associated tray.

If the horizontally extending upper portions of the hook-shaped guide members stop short of the nearby side wall portions, the spaces provided therebetween can be used to permit disc holders to be installed onto or removed from the guide members, whereby the number of disc holders and the order in which the disc holders are arranged in a stack can be changed. Alternatively, if the guide members extend into contact with and/or are rigidly connected to the nearby side wall portions, the disc holders of each stack will be held in place by each of their associated trays.

In preferred practice, each disc holder has only two of its corner-region holes engaged by the hook-shaped guide members of the type that are described above; and, the remaining two corner-region holes of each disc holder receive pin formations that project upwardly from the bottom wall to assist in orderly aligning such disc holders as are stacked one atop another within an associated tray. If desired, the same type of pin formations as are used to extend into the two remaining corner region holes also can be used to mount the hook-shaped guide members. If the hook-shaped guide members are frictionally installed as by gently but firmly pressing hollow bottom end regions of the hook-shaped guide members onto selected ones of the pin formations, the hook-shaped guide members also can be removed by gently pulling them off of the pin formations and re-orienting or repositioning the hook-shaped guide members before reinstalling them.

In preferred practice, the disc holders that are carried in the trays have their rear-most corner-region holes engaged by the hook-shaped guide members so that front regions of the disc holders must be raised and pivoted rearwardly to separate the disc holders in order to insert CDs into or to remove CDs from the stacked disc holders. However, in other embodiments, the hook-shaped guide members may be positioned to engage pin formations that are located along side walls of the trays so that the disc holders must be separated by raising and pivoting them sidewardly rather than rearwardly, as will be described later, in greater detail.

In preferred practice, one or more optional covers are provided, as may be needed, for positioning atop individual ones of the trays, and/or for positioning atop the uppermost of a stacked array of identically configured trays. The covers may be of a type that is simply removable from and insertable onto trays, or each cover may be hinge-connected to a separate one of the trays.

BRIEF DESCRIPTION OF THE DRAWINGS

These and other features, and a fuller understanding of the invention may be had by referring to the following description and claims, taken in conjunction with the accompanying drawings, wherein:

FIG. 1 is a perspective view of a first embodiment of storage system for compact discs that embodies the preferred practice of the present invention, with the view showing principally top, front and right portions of a tray that contains two side-by-side stacks of compact disc holders, with compact discs being shown in disc receiving positions that are defined by the disc holders, and with the stacks of disc holders being held in position by interengaging guide formations that include tray-mounted projecting members that extend through holes that are formed in corner regions of the disc holders;

FIG. 2 is a top plan view thereof;

FIG. 16 is a perspective view similar to FIG. 1 of an alternate embodiment of the dual-stack storage system, and having a left set of hook-shaped guide formations extending toward left sidewall portions of the tray, and a right set of hook-shaped guide formations extending toward right sidewall portions of the tray, with selected ones of the left set of disc holders shown raised and pivoted leftwardly along the left set of hook-shaped guide formations;

FIG. 17 is a perspective view of the embodiment of FIG. 15 but with selected ones of the disc holders being raised and pivoted leftwardly along the hook-shaped guide formations;

FIG. 18 is a perspective view of an alternate embodiment that is, in essence, a mirror image of the embodiment that is illustrated in FIG. 17;

DESCRIPTION OF THE PREFERRED EMBODIMENT

Figure 3:
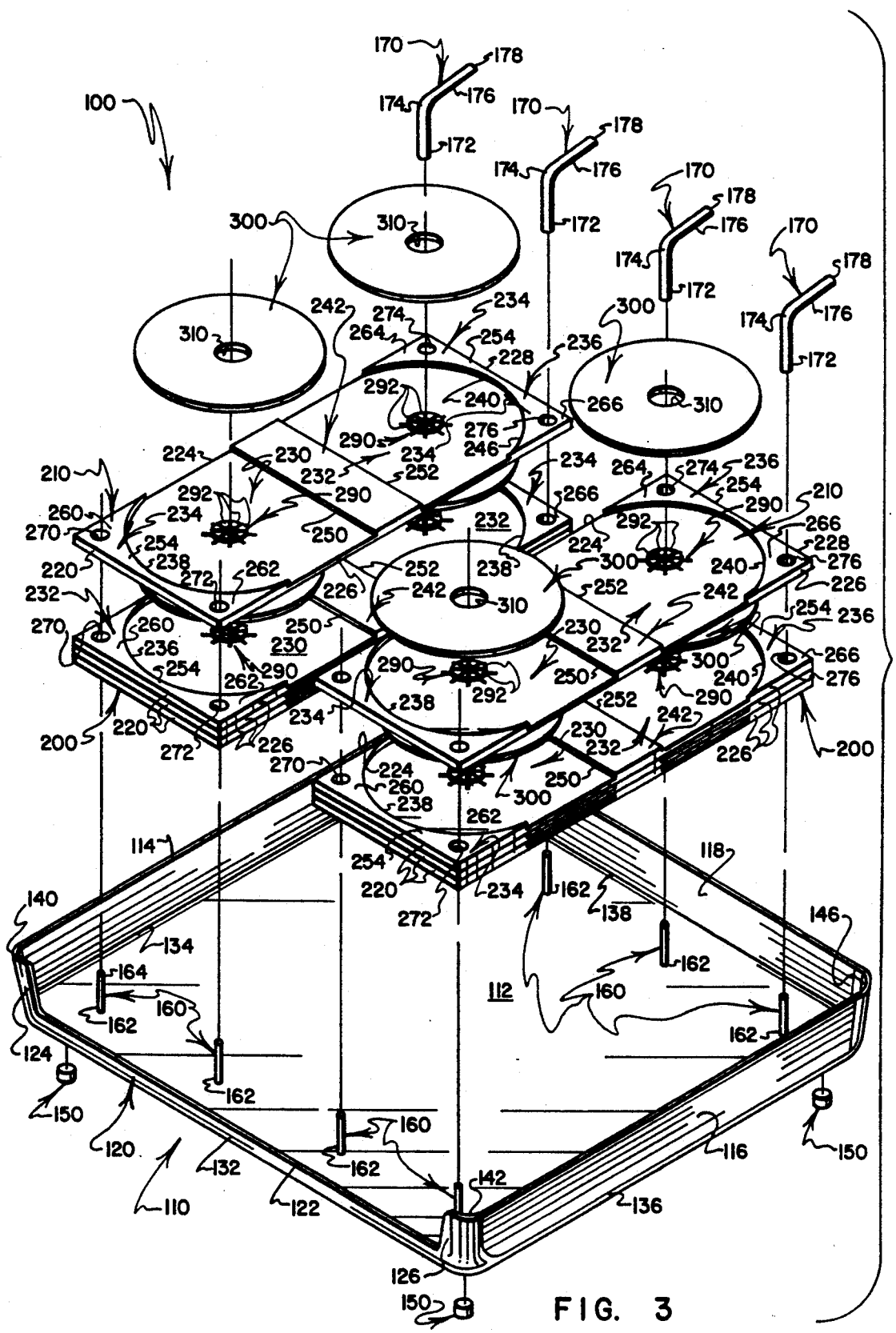
FIG. 3 is an exploded perspective view showing components thereof together with a number of CDs.

Referring to FIGS. 1 and 2, a tray 110 with stacked sets of compact disc holders 210 is depicted that incorporates features of the present invention. The tray and disc holder unit that is depicted in FIGS. 1 and 2 is indicated generally by the numeral 100. While other tray and disc holder embodiments that also incorporate features of the present invention are disclosed and described herein, the tray and disc holder unit 100 represents the embodiment that is preferred, and represents the best mode that presently known to the inventor for carrying out the practice of the present invention.

The tray and disc holder unit 100 includes an upwardly opening tray 110 that carries a pair of stacks 200 of disc holders 210. Because the tray 110 holds a pair of stacks 200 of disc holders 210, the style of the tray 110 will be referred to as being of a "dual stack" character. In the discussion that follows, features of the dual stack tray 110 (and of smaller but similarly configured "single stack" trays 110') will be described before turning to a discussion of features of the disc holders 210, for precisely the same form of disc holder 210 preferably is used regardless of the number of stacks 200 of disc holders 210 that a particular one of the trays 110, 110' may be configured to carry.

Because descriptions of many of the tray features that follow are applicable to trays that embody the present invention regardless of whether such trays are of "dual stack" or "single stack" capacity, the discussion that follows will not be unnecessarily repeated. As those who are skilled in the art will readily understand, the trays 110 that are depicted in FIGS. 1-3, 16, 19, 22, 26 and 27 are of "dual stack" capacity inasmuch as they each can carry a pair of side-by-side stacks 200 of disc holders 210. Likewise, the trays 110' that are depicted in FIGS. 13-15, 17, 18, 20, 28 and 29 are of "single stack" capacity inasmuch as they each can carry a single stack 200 of the disc holders 210. When a reference numeral is used in describing and designating a feature of a "dual stack" tray 110, it will be understood that a corresponding reference numeral followed by a "prime" mark will be used in designating a corresponding feature of a "single stack" tray 110', and vice versa.

Figure 21:
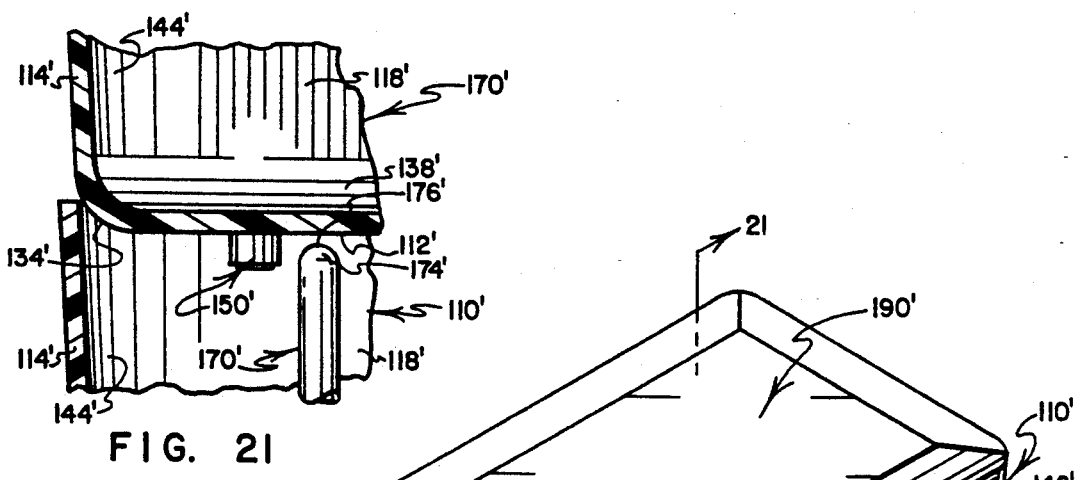
FIG. 21 is a sectional view, on an enlarged scale, of selected portions of two of the four stacked trays that are depicted in FIG. 20, as seen from a plane that is indicated generally by line 21—21 in FIG. 20.
Figure 20:
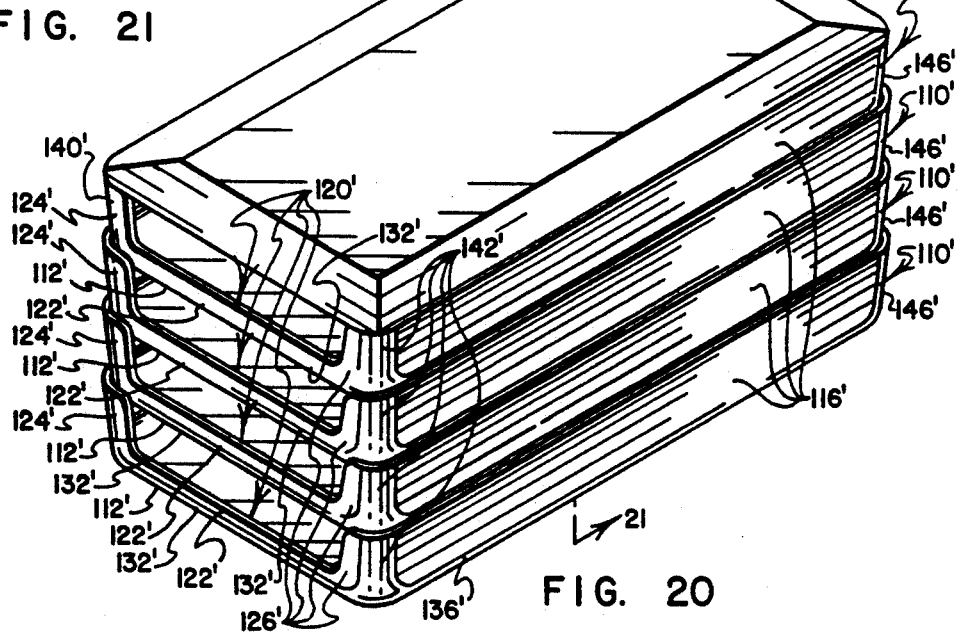
FIG. 20 is a perspective view showing a vertical stack of four trays of the type that is depicted in FIGS. 13 and 14, with an optional cover shown in place atop the uppermost of the four stacked trays.

Because features that are described in conjunction with and depicted in FIGS. 4-12, 21 and 23-25 are equally applicable to dual stack and single stack trays 110, 110', the descriptions and illustrations of these features are not unnecessarily duplicated. Rather, it will simply be understood that features depicted in FIGS. 1-12 and 23-25 are as applicable to single stack trays 110' as they are to the dual stack tray features that are depicted in these FIGS. 1-12 and 23-25. Likewise, features that are depicted in FIG. 21 are equally applicable to dual stack trays 110 as they are to the single stack tray features that are depicted in FIG. 21. Furthermore, it will be understood that features of such rear-hinged and side-hinged covers such as are illustrated in FIGS. 26-29 can be used with trays having features that are illustrated in FIGS. 1-25.

Figure 22:
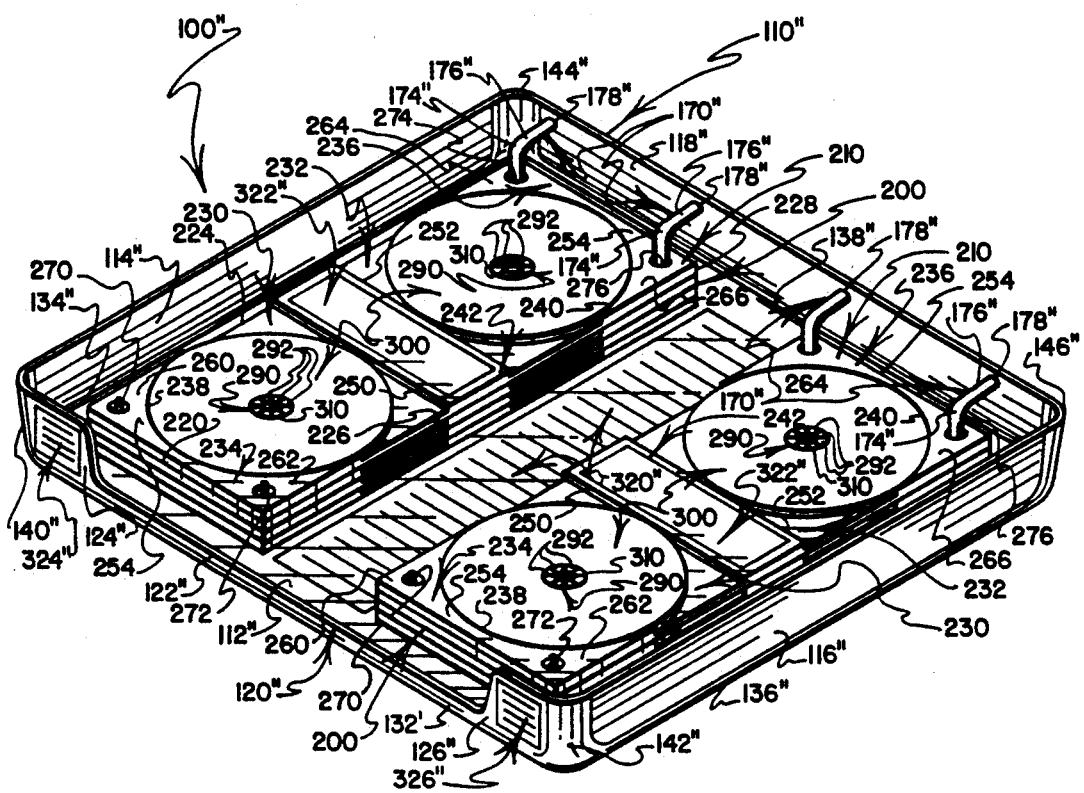
FIG. 22 is a perspective view similar to FIG. 1 but showing an alternate label-carrying tray embodiment that contains label-carrying sets of disc holders arranged in side-by-side stacks.

With respect to the dual-stack tray embodiment 100" that is depicted in FIG. 22, the only structural difference between it and the dual-stack tray embodiment that is depicted in FIG. 1 is that left and right end regions 124", 126" of its front wall 120" are slightly longer than are corresponding features 124, 126 of the tray 100; and, the connecting reach 122" of the front wall 120" is a bit shorter than is a corresponding reach 122 of a front wall 120 of the tray 100. Thus, while features of the tray 110" that correspond to the tray 110 are designated by corresponding numerals that carry a "double prime" mark, it will be understood that the trays 100, 100" are structurally identical except for the differing tray features that are pointed out in this paragraph.

Figure 19:
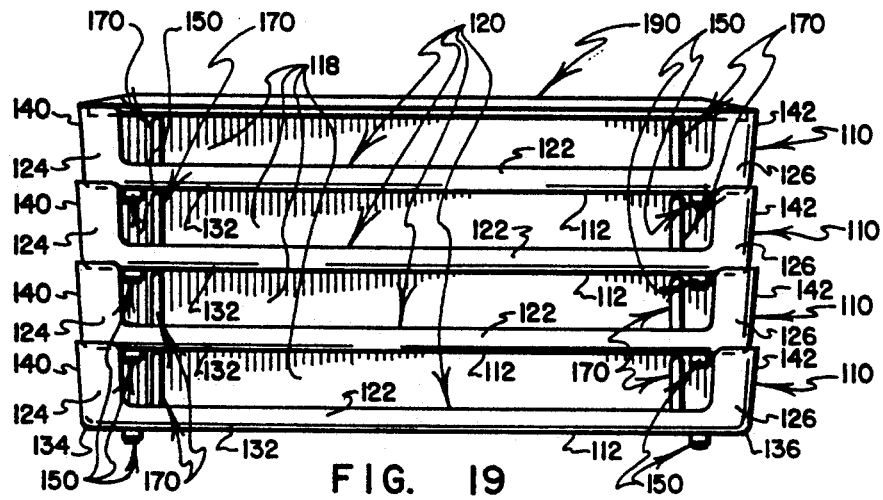
FIG. 19 is a front side elevational view of a vertical stack of four trays of the type that is depicted in FIG. 1, with an optional cover shown in place atop the uppermost of the four stacked trays.
Figure 23:
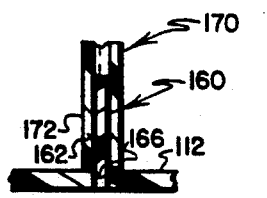
FIG. 23 is a sectional view as seen from a plane indicated by a line 23—23 in FIG. 7 of a first form of projecting pin member that may be used to connect one of the hook-shaped guide members to the bottom wall of its associated tray.

Referring to FIGS. 1-3, the tray 110 has a bottom wall 112, a pair of upstanding side walls 114, 116, a rear wall 118, and a front wall 120. The front wall 120 has a central reach 122 of relatively short height, which provide a convenient formation to use in grasping the tray 110 when the tray 110 is stored by itself on a shelf (not shown) or in a stack (such as is depicted in FIG. 19) or when the tray 110 has a cover 190 installed atop it (see the uppermost one of the trays 110 shown in the stack of trays 110 that is depicted in FIG. 23).

Referring still to FIGS. 1-3, the relatively short front wall portion 122 extends between left and right front wall portions 124, 126 that are of substantially equal height as the side and rear walls 114, 116, 118. By this arrangement, upper edge portions of the side, rear and front walls 114, 116, 118, 120 can be engaged by a suitably configured cover 190 to support the cover 190 atop the tray 110.

A smoothly rounded juncture 132 joins lower portions of the front wall 120 with front perimeter portions of the bottom wall 112. Likewise, smoothly rounded junctures 134, 136, 138 join lower portions of the side and rear walls 114, 116, 118 with side and rear perimeter portions of the bottom wall 112. A smoothly rounded juncture 140 joins the left front wall portion 124 with the left side wall 114, and a similar smoothly rounded juncture 142 joins the right front wall portion 126 with the right side wall 116. Likewise, smoothly rounded junctures 144, 146 join left and right portions of the rear wall 118 with rear portions of the left and right side walls 114, 116, respectively.

The side, rear and front walls 114, 116, 118, 120 and the curved junctures 140, 142, 144, 146 that are formed therebetween taper slightly outwardly as they extend upwardly from the bottom wall 112. However, the extent of this outward inclination of the upstanding walls of the tray 110 is of relatively small magnitude, adequate only to facilitate the stacking of identical ones of the trays 110 atop each other, as is depicted in FIG. 19. When identical ones of the trays 110 are stacked atop each other in the manner shown in FIG. 19, the regions of the curved junctures 132, 134, 136, 138 of an upper one of two engaging trays 110 engage upper edge regions of the side, rear and front walls 114, 116, 118, 120.

Referring to FIGS. 3 and 19, four feet 150 are attached to the underside of the bottom wall 112 at the four corner regions thereof. While only two of the feet 150 per tray are depicted in FIG. 19, and while only three of the four feet 150 are depicted in FIG. 3, it will be understood that each of the feet 150 is attached to its respective corner region of the underside of the bottom wall at a location that is substantially equally spaced from nearby pairs of the side, rear and front walls 114, 116, 118, 120.

Referring to FIGS. 3 and 23, generally cylindrical pins 160 have their lower end regions 162 connected to the bottom wall 112, and have upper portions 164 that project substantially vertically upwardly from the substantially flat, substantially horizontally extending bottom wall 112. In the embodiment depicted in FIG. 23, the lower end regions 162 of the pins 160 extend into and are securely retained in holes 166 that are formed in the bottom wall 112. However, as those who are skilled in the art readily will appreciate, the lower end regions 162 of the pins 160 could be formed integrally with the bottom wall 112 (as is depicted in FIG. 24), or headed rivet-shaped members 168 could be extended through holes 166 to define the upwardly projecting portions 164 of the pins 160 (as is depicted in FIG. 25).

Figure 4:
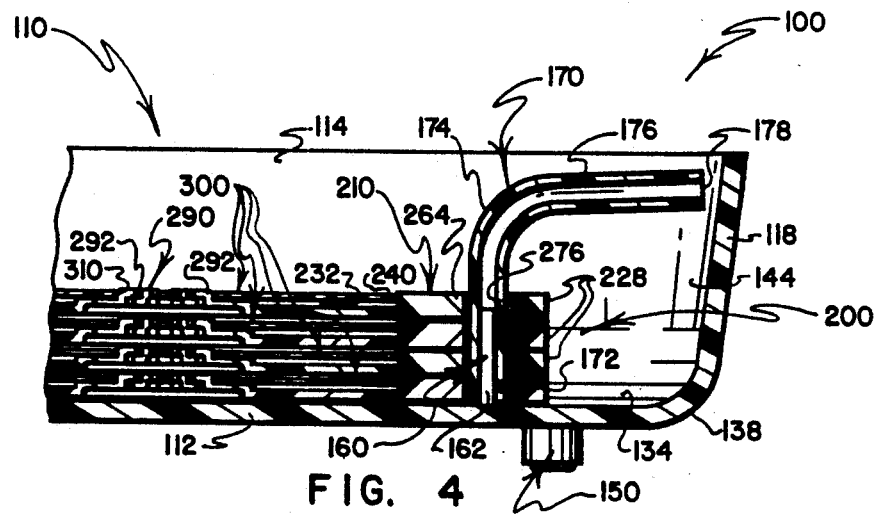
FIG. 4 is sectional view, on an enlarged scale, as seen from planes that are indicated by a broken line 4—4 in FIG. 2.
Figure 5:
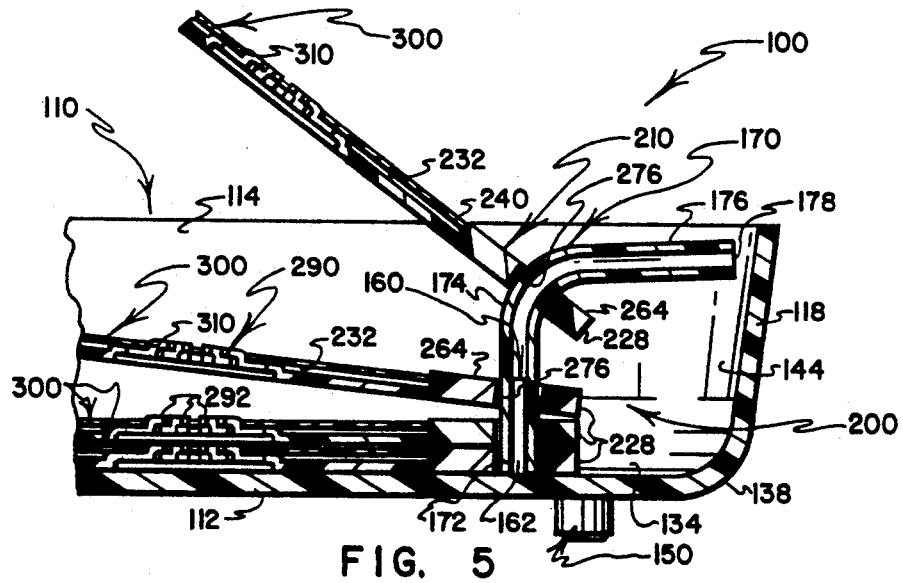
FIG. 5 is a sectional view similar to FIG. 4 but with two of the disc holders raised and pivoted out of their normally stacked positions.
Figure 6:
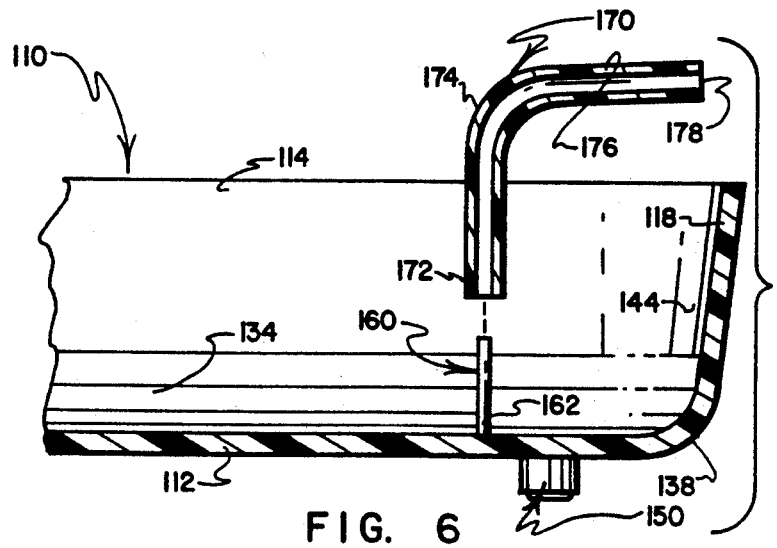
FIG. 6 is an exploded sectional view showing portions of the tray structure that also are shown in FIGS. 4 and 5.
Figure 7:
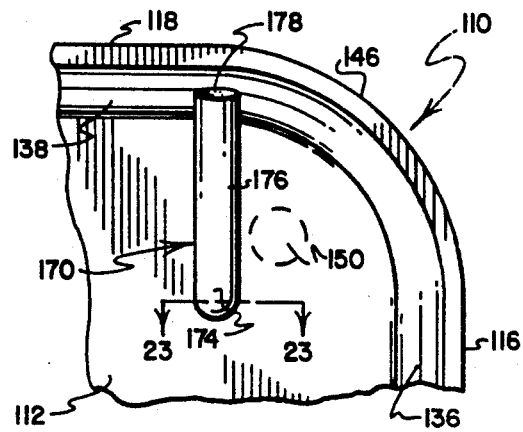
FIG. 7 is a top plan view, on an enlarged scale, of a corner region of the tray and a tray-carried hook-shaped guide formation that projects toward but stops at a location spaced from a rear wall portion of the tray, with a foot that is carried on the underside of the corner region of the tray being depicted in dotted lines.
Figure 8:
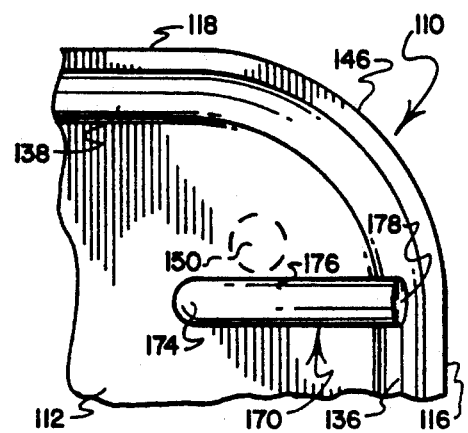
FIG. 8 is a top plan view similar to FIG. 7 but showing an alternate embodiment that has its hook-shaped guide formation projecting toward but stopping at a location spaced from a right sidewall portion of the tray.
Figure 9:
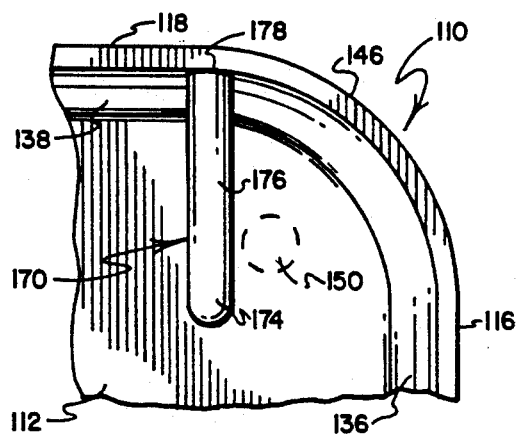
FIG. 9 is a top plan view similar to FIG. 7 but showing an alternate embodiment that has its hook-shaped guide formation extending into engagement with the rear wall portion of the tray.
Figure 10:
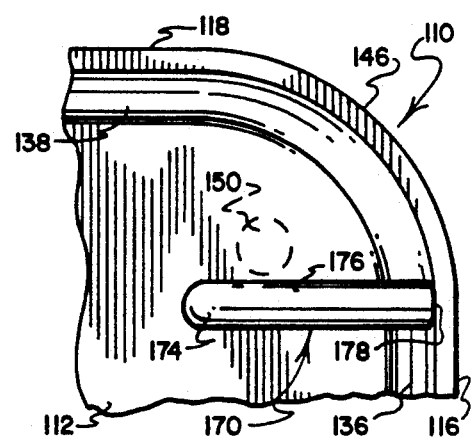
FIG. 10 is a top plan view similar to FIG. 8 but showing an alternate embodiment that has its hook-shaped guide formation extending into engagement with the right sidewall portion of the tray.
Figure 24:
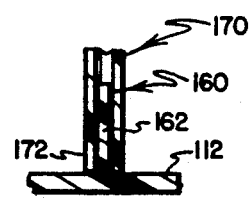
FIG. 24 is a sectional view similar to FIG. 23 but showing a second form of projecting pin member that may be used to connect one of the hook-shaped guide members to the bottom wall of its associated tray.
Figure 25:
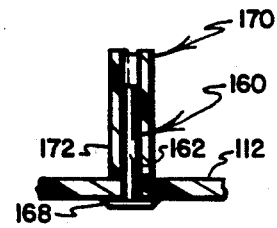
FIG. 25 is a sectional view similar to FIG. 23 but showing a third form of projecting pin member that may be used to connect one of the hook-shaped guide members to the bottom wall of its associated tray.

Regardless of the manner in which the pins 160 are formed and/or are secured to the bottom wall 112, hollow bottom end regions 172 of hook-shaped guide members 170 are installed on selected ones of the pins 160, as is shown in FIGS. 23-25, and as also is depicted in FIGS. 4 and 5. Referring to FIGS. 4 and 5, the hook-shaped guide members 170 have centrally located elbow formations 174 that connect the substantially vertically extending lower leg portions 172 of the guide members 170 with substantially horizontally extending upper leg portions 176 of the guide members 170. The upper leg portions 176 have end regions 178, as is well illustrated in FIGS. 4-6.

Whether the end regions 178 are held in spaced relationship with rear or side wall portions 118, 116 (as is depicted in FIGS. 4, 5, 7 and 8, or extend into abutting engagement with rear or side wall portions 118, 116 (as is depicted in FIGS. 9-12) is a matter of preference—with either option having its advantages and disadvantages. If the end regions 178 extend toward but remain in paced relationship with their adjacent rear or side wall portions 118, 116 (as is depicted in FIGS. 1, 2, 4, 5, 7 and 8), the space between the end regions 178 and the adjacent rear or side wall portions 118, 116 may be used to permit disc holders 210 (which are described in detail later herein) to be oriented substantially vertically so that corner regions of the disc holders 210 can be moved within such spaces to hook disc holders 210 onto the hook-shaped guide members 170 or to remove disc holders 210 from the hook-shaped guide members 170.

Figure 11:
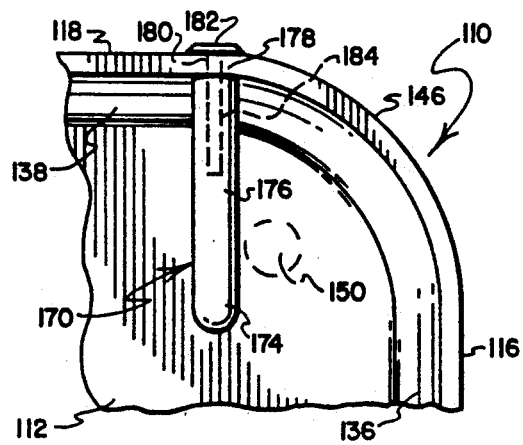
FIG. 11 is a top plan view similar to FIG. 9 but showing an alternate embodiment that has its hook-shaped guide formation secured to the rear wall portion of the tray by means of a rivet that extends through aligned holes formed therein.
Figure 12:
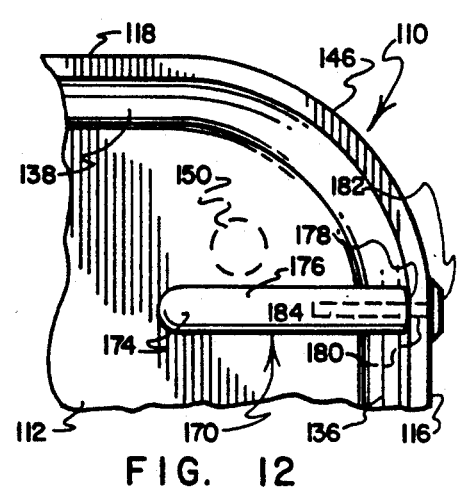
FIG. 12 is a top plan view similar to FIG. 10 but showing an alternate embodiment that has its hook-shaped guide formation secured to the right sidewall portion of the tray by means of a rivet that extends through aligned holes formed therein.

If the end regions 178 of the hook-shaped guide members 170 extend into engagement with their associated rear or side wall portions 118, 116 (as is illustrated in FIGS. 9-12), any disc holders 210 that are "hooked onto" the hook-shaped guide members 170 will be as permanently connected to their associated trays 110 as are their associated hook-shaped guide members 170. If desired, the end regions 178 of the hook-shaped guide members can be rigidly connected to the rear or side wall portions 118, 115 by using headed, rivet-shaped members 182, as is depicted in FIGS. 11 and 12. Referring to FIGS. 11 and 12, the members 180 have generally cylindrical body portions 184 that 1) extend through holes 180 that are formed through the rear or side wall portions 118, 116, and 2) extend into the hollow end regions 178 of the upper leg portions 176 of the hook-shaped guide members 170.

Figure 13:
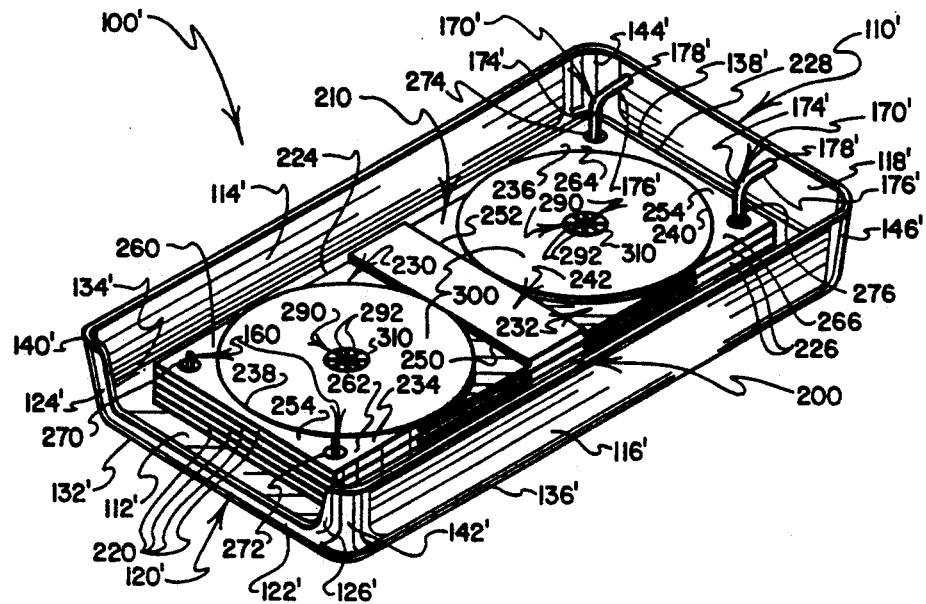
FIG. 13 is a perspective view of a second form of storage system for compact discs that embodies features of the preferred practice of the present invention, with the view showing principally top, front and right portions of a tray that carries a single stack of disc holders, with compact discs being shown held in disc receiving positions that are defined by disc holders, and with the disc holders being retained in an orderly stack by interengaging formations that include tray-mounted protecting members that extend through holes formed in corner regions of the disc holders.
Figure 14:
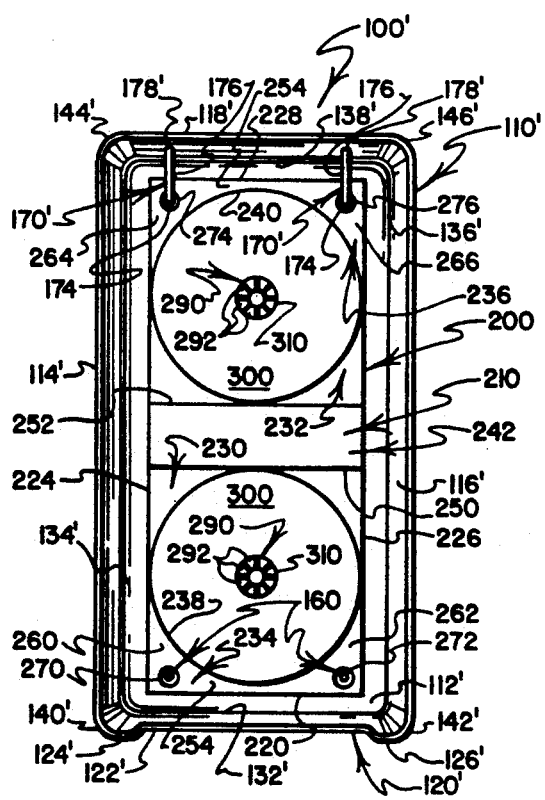
FIG. 14 is a top plan view thereof.
Figure 15:
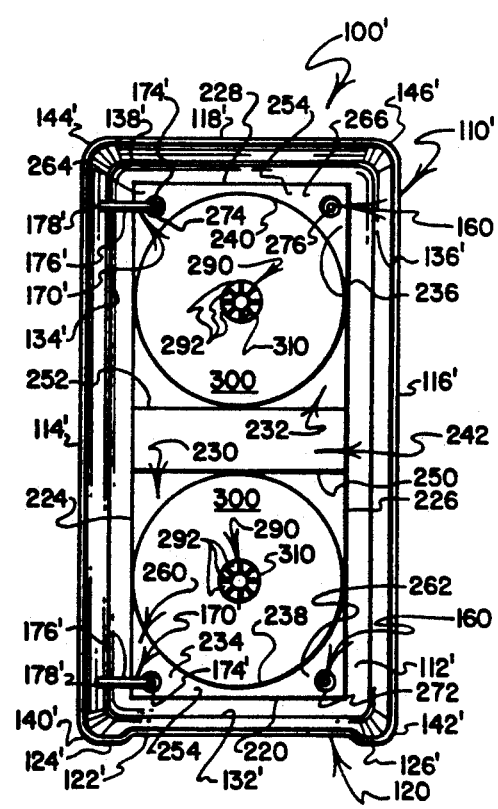
FIG. 15 is a top plan view of an alternate embodiment of the single-stack storage system of FIGS. 13 and 14, and having hook-shaped guide formations that extend toward left sidewall portions of the tray.

An advantage of not rigidly connecting the hook-shaped members 170 to the adjacent rear or side wall portions 118, 116 is that, if the lower end regions 172 of the hook-shaped guide members 170 are simply frictionally installed on the bottom-wall-carried pins 160 (as by gently but firmly pressing the hollow interiors of the lower end regions 172 of the guide members 170 onto the pins 160), the hook-shaped guide members 170 can be gently pulled off of the pins 160 on which they are mounted and repositioned the hook-shaped guide members 170 so that the disc holders 210 contained within an associated tray can be "raised and pivoted" about their associated hook-shaped guide members 170 in any of four selected directions (i.e., rearwardly, forwardly, rightwardly or leftwardly). For example, by removing and repositioning the hook-shaped guide members 170 that are shown in FIGS. 1-3, the unit 100 that is depicted in FIGS. 1-3 can be converted from having its disc holders 210 "pivot" rearwardly to an alternate arrangement which is depicted in FIG. 16 wherein the disc holders 210 of the left stack 200 "pivot" leftwardly, and the disc holders 210 of the right stack 200 "pivot" rightwardly. Similarly, the single stack tray 100' that is depicted in FIGS. 13 and 14 can be converted from having its disc holders 210 pivot rearwardly to the arrangement of FIGS. 15 and 17 wherein the disc holders 210 pivot leftwardly, or the arrangement of FIG. 18 wherein the disc holders 210 pivot rightwardly.

Referring to FIG. 21, in accordance with a feature of the preferred practice of the present invention, the hook-shaped guide members 170' preferably are not so tall as to be engaged by the bottom wall 112' of a tray 110' that is stacked atop an identically configured tray 110' (with the same being true regarding the hook-shaped guide members 170 of the tray 110). As also is depicted in FIG. 21, stacked trays 110' (that are of identical configuration) "nest" one within another in that the rounded formations that join the bottom wall 112' to the upstanding side, rear and front walls 114', 116', 118', 120' (such as the rounded formation 134' that is depicted in FIG. 21) engage upper edge portions of the corresponding side, rear and front walls of an underlying tray 110'; and, in doing this neither the bottom wall 112' of an overlying tray 100' nor the depending feet 150' of an overlying tray 110' engage the hook-shaped guide members 170' of an underlying tray 110'.

Turning now to a discussion of the configuration and features of the disc holders 210, and referring principally to FIG. 3, each disc holder 210 is preferably is injection molded as a single piece of relatively rigid thermoplastic material. Each of the disc holders 210 has a generally rectangular shape, as defined by a front edge surface 220, left and right edge surfaces 224, 226, and a rear edge surface 228. Disc receiving formations 230, 232 are defined near front and rear end regions of the disc holders 210.

Raised front and rear portions 234, 236 of the disc receiving formations 230, 232 define inwardly-facing curved surfaces 238, 240 that have a curvature which permits the curved surfaces 238, 240 to extend closely along portions of the circumferences of such compact discs 300 as may be positioned within the disc receiving formations 230, 232. The curved surfaces 238, 240 are sufficiently tall to assure that, when a compact disc 300 is received within one of the disc receiving formations 230, 232, the associated raised front or rear portion 234, 236 will extend to a height that rises above the received compact disc 300—whereby the raised front and rear portions 234, 236 assist in protecting the received compact disc 300 from being contacted by a disc holder 210 that is stacked atop the raised front and rear formations 230, 232.

Just as the raised front and rear portions 234, 236 serve to assist the disc receiving formations 230, 232 in protectively receiving compact discs 300, a raised central portion 242 is provided to separate the disc receiving formations 230, 232 and to extend to a sufficient height above compact discs 300 that are received by the disc receiving formations 230, 232 to assist in protecting the received compact discs 300 from being contacted by a disc holder 210 that is stacked atop the raised central portion 242. The raised central portion 242 defines a pair of opposed upstanding surfaces 250, 252 that extend along central portions of compact discs 300 that are received within the disc receiving formations 230, 232.

The raised front and rear portions 234, 236 define upwardly facing surfaces 254, 256 that extend across the front and rear end regions of the disc holders 210. Corner regions 260, 262 of the front upwardly facing surface 254 are defined near where the front edge 220 joins with the left and right edges 224, 226, respectively. Corner regions 264, 266 of the rear upwardly facing surface 256 are defined near where the rear edge 228 joins with the left and right edges 224, 226, respectively. Holes 270, 272, 274, 276 are formed through the corner regions 260, 262, 264, 266, respectively.

The holes 270, 272, 274, 276 that are formed in the disc holders 210, and the tray-mounted hook-shaped guide members 170 comprise what are referred to elsewhere herein as "interactive guide formations" that cooperate 1) to permit the disc holders 210 to be moved relative to each other so that compact discs 300 can be positioned in and selectively removed from the disc receiving formations 230, 232, and 2) to facilitate the orderly stacking of the disc holders 210 so that, when arranged to form the stacks 200, the disc holders 210 extend juxtaposed one atop another with each disc holder 210 extending substantially parallel to the bottom wall 112 of the associated tray 110. Actually, inasmuch as two of the four holes 270, 272, 274, 276 that are formed through each disc holder 210 do not receive hook-shaped guide members 170 but rather each simply receive one of the upstanding pins 160, the interaction that takes place by virtue of the pins 160 being received within two of the four holes 270, 272, 274, 276 also assists in facilitating the orderly stacking of the disc holders 210 in their associated trays 110, as those who are skilled in the art will readily understand.

The compact discs 300 may be releasably retained within the disc receiving formations 230, 232 by any of a variety of means that are well known those who are skilled in the art. For example, suitably configured formations (not shown) may be provided that engage and/or overlie circumferential portions of a compact disc 300 that is nested within one of the disc receiving formations 230, 232. In preferred practice, however, one of a number of radially expansible gripping devices the type that are intended for use with compact discs and that project through "hub holes" 310 of compact discs 300 to "grip" such CD portions as extend about the hub holes 310 are utilized. One such form of hub hole gripping device is indicated generally by the numeral 290 in FIGS. 1–5, 13–18 and 22.

Referring principally to FIGS. 3 and 4, the hub hole gripping device 290 includes a plurality of pie-slice-shaped segments 292 that are sufficiently small and delicate to permit their being deflected slightly radially inwardly to permit a compact disc 300 to have its hub hole 310 moved into position to surround portions of the segments 292, whereupon the "memory" of the segments 292 causes them to snugly grip such portions of the CD 300 as define its hub hole 310. To remove a CD from being releasably retained by the gripping action of the segments 292, the pointed tips of the pointed segments 292 are pushed downwardly (toward the back wall 112) to release the grip of the segments 292 on the CD's hub hole 310, whereupon the CD 300 is "released" and can be raised out of the disc receiving formation 230 or 232 wherein it has been protectively but releasably retained by the gripping device 290.

If the reader would like additional information on the manner in which typical CD hub hole gripping devices typically are formed, reference is made to U.S. Pat. No. 4,702,369 issued Oct. 27, 1987 to Isidore Philosophe, and to U.S. Pat. No. 4,793,479 issued Dec. 27, 1988 to Chusaburo Otsuka and Toshitsuga Yajima, the disclosures of which are incorporated herein by reference.

These patents disclose features of CD hub hole gripping devices for releasably retaining CDs. Other forms of CD hub hole gripping devices also are found in products that currently are being marketed.

Referring to FIG. 22, a manner in which a variety of labels can be applied to the tray and disc holder unit 100" to assist users in organizing not only the trays 110" but also the disc holders 210 that are contained therein is illustrated. Front wall portions 124", 126" are provided with labels 324", 326", respectively. A central part of the bottom wall 112" of the tray 110" is provided with a much more sizable label 320". Raised central portions 242 of the disc holders 210 are provided with labels 322". By utilizing the labels 320", 322", 324", 326" to identify not only the tray 110" but also the compact discs 300 that are held by its disc holders 210, the location where a particular compact disc 300 is to be inserted for storage and/or should be found when it is to be retrieved can be found with ease, in a minimum of time.

Figure 26:
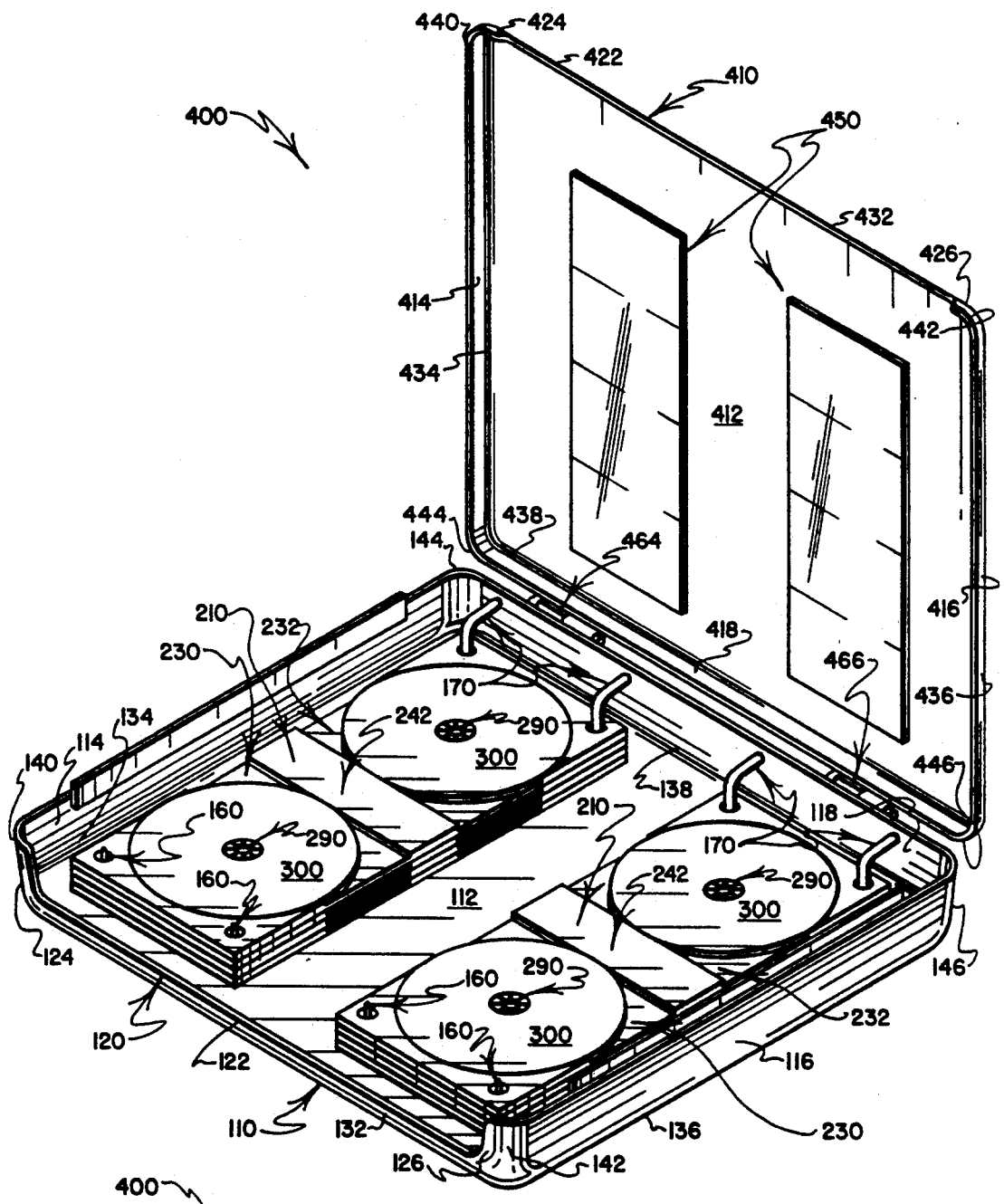
FIG. 26 is a perspective view similar to FIG. 1 but showing the tray of FIG. 1 with a cover that is hinge-connected to the upstanding rear side wall of the tray, with the cover being shown in an open position.
Figure 27:
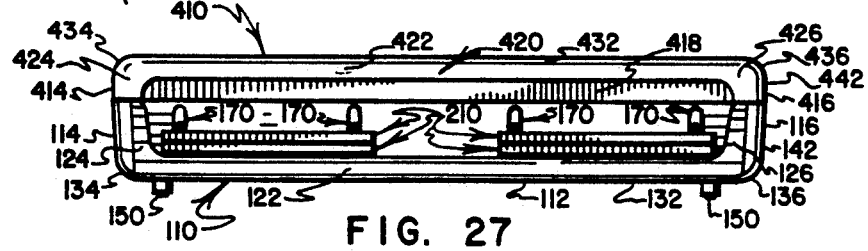
FIG. 27 is a front side elevational view showing the tray of FIG. 26 with the hinge-connected cover closed.
Figure 28:
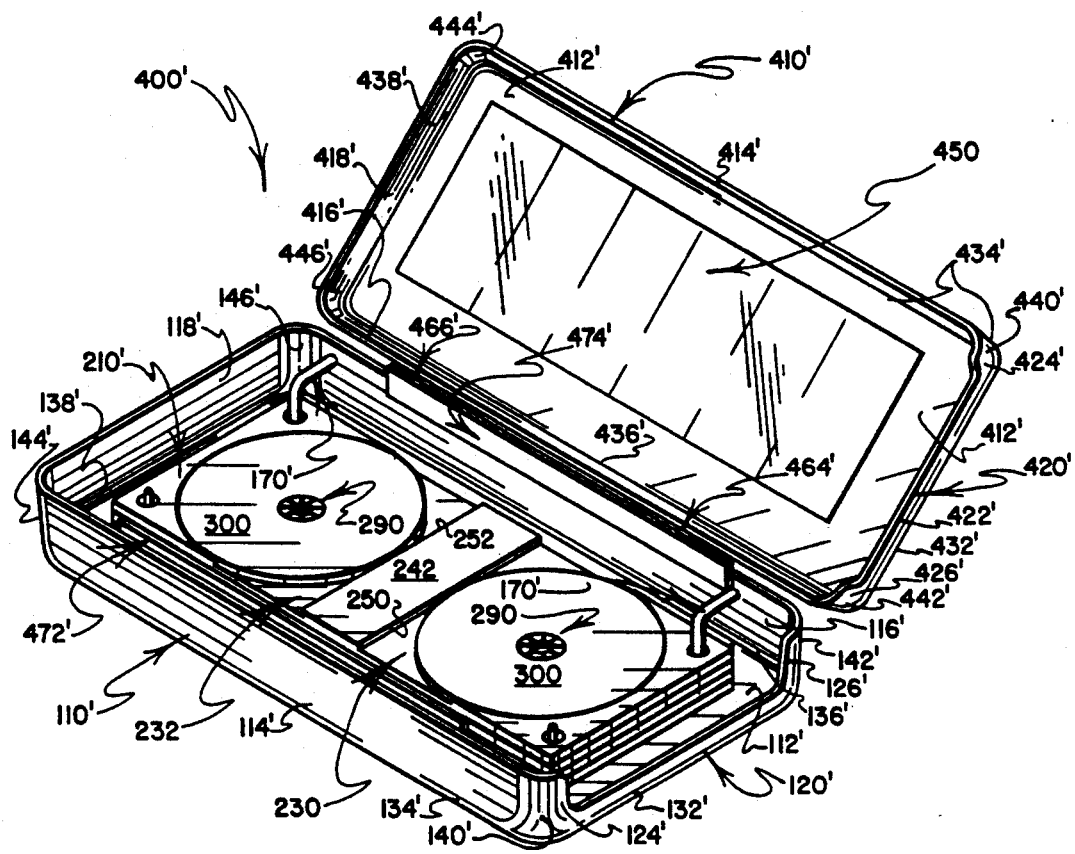
FIG. 28 is a perspective view similar to FIG. 18 but showing the tray of FIG. 18 with a cover that is hinge-connected to the upstanding right side wall of the tray, with the cover being shown in an open position; and, FIG. 29 is a front side elevational view showing the tray of FIG. 28 with the hinge-connected cover closed.
Figure 29:
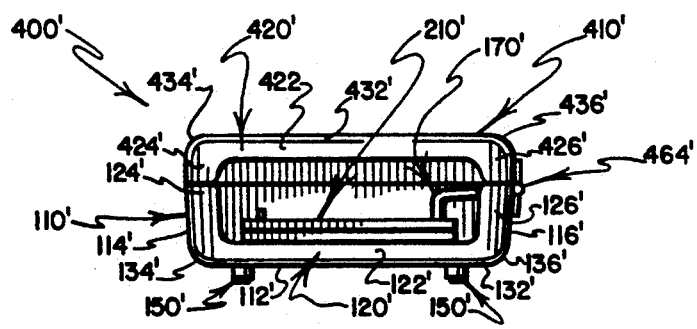

Referring to FIGS. 26 and 27, the depicted storage unit 400 includes a dual stack tray 110 (which is identical to the dual stack tray 110 that is depicted in FIG. 1), disc holders 210 that are the same as has been described above, and a cover 410 that is pivotally connected to the tray 110. Referring to FIGS. 28 and 29, the depicted storage unit 400' includes a single stack tray 110' (which is identical to the single stack tray 110' that is depicted in FIG. 18), disc holders 210 that are the same as has been described above, and a cover 410' that is pivotally connected to the tray 110. While the cover 410 is shown as being rearwardly hinged, it will be understood that the cover 410 could be rightwardly hinged (as is illustrated in conjunction with the cover 410'), or could be leftwardly hinged (in a manner that is essentially a "mirror image" of the right hinged cover 410'). Likewise, while the cover 410' is shown as being sidewardly hinged, it will be understood that the cover 410' could be rearwardly hinged (as is illustrated in conjunction with the cover 410).

In the discussion of the covers 410, 410' that follows, when a reference numeral is used in describing and designating a feature of the "dual stack" cover 410, it will be understood that a corresponding reference numeral followed by a "prime" mark is used to designate a corresponding feature of a "single stack" cover 410', and vice versa.

With respect to the dual-stack tray embodiment 110 that is depicted in FIG. 26 and 27, the only differences between it and the dual-stack tray embodiment 110 that is depicted in FIGS. 1 and 2 is the addition thereof to 1) of left and right rear-wall-mounted hinges 464, 466 for pivotally mounting the cover 410 atop the tray 110, and 2) of left and right side-wall-mounted guides 472, 474 that engage the interior of opposite side wall portions of the cover 410 as it closes to aid in maintaining proper alignment of the cover 410 with the tray 110.

With respect to the single-stack tray embodiment 110' that is depicted in FIG. 28 and 29, the only differences between it and the single-stack tray embodiment 110' that is depicted in FIG. 18 is the addition thereto 1) of front and rear right-wall-mounted hinges 464', 466' for pivotally mounting the cover 410' atop the tray 110', and 2) of left and right side-wall-mounted guides 472', 474' that engage the interior of opposite side wall portions of the cover 410' as it closes.

Referring to FIGS. 26 and 27, the cover 410 has a top wall 412, a pair of depending side walls 414, 416, a depending rear side wall 418, and a depending front side wall 420. The front wall 420 has a central reach 422 of relatively short dependency (i.e., its "height" is short) which overlies a corresponding configured reach 122 of the front wall 120 of the tray 110. The open space that is defined between the spaced reaches 122, 422 provides means for being engaged by one's hand to move the unit 400 and/or to open the cover 410.

The reach 422 extends between left and right front wall end regions 424, 426 that are of substantially the same height as the side and rear walls 414, 416, 418. The side walls 414, 416, the rear side wall 418 and the front side wall portions 424, 426 have bottom edge surfaces that can be seated atop the left and right side walls 114, 116, atop the rear side wall 118, and atop the front side wall portions 124, 126, respectively, when the cover 410 is closed.

Smoothly rounded junctures 434, 436, 438, 440 join upper portions of the side, rear and front walls 414, 416, 418, 420 with side, rear and front perimeter portions of the top wall 412, respectively. A smoothly rounded juncture 440 joins the left end region 124 of the front wall 420 with the left side wall 414. A similar smoothly rounded juncture 442 joins the right end region 126 of the front wall 420 with the right side wall 416. Likewise, smoothly rounded junctures 444, 446 join left and right end regions of the rear wall 418 with rear portions of the left and right side walls 414, 416, respectively.

The side, rear and front walls 414, 416, 418, 420 and the curved junctures 440, 442, 444, 446 that are formed therebetween taper slightly outwardly as they depend from the top wall 412. However, the extent of this outward inclination of the depending walls of the cover 410 is of relatively small magnitude. A labeling area, designated generally by the numeral 450, is preferably provided on central interior surface portions of the cover 410 for labeling the contents of such disc holders 210 as are carried by the tray 110.

As will be apparent from the foregoing description, the present invention provides a well organized and easy-to-use system for the safe storage and ready retrieval of CDs. The system easily can be expanded by the addition thereto of trays and/or disc holders of the type described. Identical trays used in a particular system can be stacked in one or a plurality of stacks, or can be individually supported for storage on shelves. If desired, covers can be provided atop stacks of trays, or atop individual trays, and can be hinge-connected to the trays, if desired. The extent to which such a CD storage system can be expanded is without limit, whereby the system can, in essence, accommodate substantially any desired number of CDs.

As also will be apparent, the versatility of the system is complemented by its simplicity of construction, with hook-shaped guide members being installable in any of a variety of orientations within the trays to mount the disc holders for movement in any of a variety of orientations, as has been described. The simplicity of the component parts of the system, and the ease with which they can be formed and assembled provides a relatively low cost of manufacture, and yet yields a sturdy product that can be counted on to provide a lengthy service life.

While a variety of "orientation terms" such as "horizontally extending," "vertically extending," "rearward," "forward," "sideward," "leftward," "rightward," "front," "rear", "left," "right" and the like are used herein, it will be understood that the use of such terms is not intended to be limiting in nature but rather is intended to simplify and expedite the presentation and readability of the text wherein such terms are used.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A system for organizing, releasably retaining and protectively storing a plurality of compact discs comprising:
    a) tray means for defining a tray having a substantially flat, generally rectangular bottom wall for extending substantially horizontally 1) between left and right peripheral portions of the bottom wall, and 2) between front and rear peripheral portions of the bottom wall, with the tray also 1) having upstanding left and right side walls that join smoothly with the left and right peripheral portions of the bottom wall, respectively, and 2) having upstanding front and rear side walls that join smoothly with the front and rear peripheral portions of the bottom wall, respectively, and with the bottom wall cooperating with said upstanding side walls to define an upwardly opening tray of generally rectangular shape;
    b) disc holder means for defining a plurality of substantially identical disc holders that are stackable one atop another for extending in juxtaposed relationship to define a stack of disc holders that can be received by the tray and can be supported therein by being positioned atop the bottom wall, with each of the disc holders being relatively thin, substantially flat and generally rectangular in shape, with the peripheries of each disc holder being defined by left, right, front and rear edge surfaces, with adjacent ones of the left, right, front and rear edge surfaces of each disc holder joining to define four corner regions, with each of the disc holders defining a pair of disc receiving formations that each provides an upwardly opening recess that is configured to receive and releasably retain therein a separate compact disc, and with the disc receiving formations being configured such that, when the plurality of disc holders are stacked one atop another in juxtaposed relationship, compact discs carried by a lower of two adjacent disc holders are not contacted by portions of the upper of the two adjacent disc holders; and,
    c) interengaging guide means for permitting the disc holders to be moved relative to each other while being connected to the tray so that compact discs can be positioned in and removed from the disc receiving formations defined by the disc holders, and for facilitating the orderly stacking one atop another of the disc holders within the tray, including:
        i) holes formed through the four corner regions of each of the disc holders, with corresponding ones of the holes being positioned to align when the disc holders are stacked one atop another in juxtaposed relationship, whereby four sets of aligned holes are defined when the disc holders are stacked within the tray;

ii) guide means for defining four elongate guide formations with each being connected to the bottom wall at a separate location that positions it to extend into a separate one of the four sets of aligned holes when the disc holders are stacked one atop another in juxtaposed relationship, and when the resulting stack is positioned atop the bottom wall so as to be supported by and contained within the tray; and, iii) two of the guide formations include hook-shaped guide members that have transversely extending upper portions that overlie portions of the bottom wall and that extend in substantially parallel relationship toward a selected one of the upstanding side walls for establishing a connection between each of the disc holders and the tray that permits the disc holders to be raised and pivoted relatively to each other and relative to the tray without defeating the connection between the disc holders and the tray so that compact discs can be selectively inserted into and withdrawn from the disc receiving formations while the disc holders remain connected to the tray.

2. The system of claim 1 wherein the upper portions of the hook-shaped guide members have ends that extend toward but maintain a spaced distance from said selected one of the upstanding side walls, and the space that is provided between the ends and adjacent portions of said selected side wall is sufficient to permit portions of a disc holder to be moved therein so that disc holders can be removed, one at a time, from being connected to the tray, and so that disc holders can be added one at a time to the stack of disc holders that is connected to the tray.

3. The system of claim 1 wherein the upper portions of the hook-shaped guide members have ends that extend toward and into engagement with said selected one of the upstanding side walls.

4. The system of claim 3 wherein the ends that extend into engagement with said selected one of the upstanding side walls are rigidly connected to said selected one of the upstanding side walls.

5. The system of claim 4 wherein the ends that extend into engagement with said selected one of the upstanding side walls are hollow, and pins extend through holes formed through said selected one of the upstanding side walls and into the hollow ends to assist in establishing rigid connections between the ends and said selected one of the upstanding side walls.

6. The system of claim 1 wherein said selected side wall is the rear wall of the tray.

7. The system of claim 1 wherein said selected side wall is the right side wall of the tray.

8. The system of claim 1 wherein said selected side wall is the left side wall of the tray.

9. The system of claim 1 wherein the four elongate guide formations include four generally cylindrical pin-shaped formations that extend upwardly from the bottom wall, and the hook-shaped guide members have hollow lower end regions into which two of the pin-shaped formations extend so as to at least assist in establishing a rigid connection between the hook-shaped guide members and the pin-shaped formations that extend therein.

10. The system of claim 8 wherein the pin-shaped formations that extend into the hollow lower end regions of the hook-shaped guide members are defined by pins that extend through holes formed through the bottom wall and into the hollow lower end regions to assist in establishing rigid connections between the lower end regions and the bottom wall.

11. The system of claim 1 wherein the tray is configured such that its bottom wall will support a single stack of said disc holders, and the upstanding side walls are configured to extend alongside so as to effectively surround said single stack of said disc holders when said stack is positioned within the tray.

12. The system of claim 1 wherein the tray is configured such that its bottom wall will support a pair of stacks of said disc holders with said stacks extending in spaced, side-by-side relationship, and the upstanding side walls are configured to surround said pair of stacks when said stacks are positioned within the tray.

13. The system of claim 12 wherein an exposed area of bottom wall extends between and separates said pair of stacks, and a label is affixed to the bottom wall within said exposed area to enable the contents of the disc holders that comprise the stacks to be set out on said label.

14. The system of claim 1 wherein each of the disc holders have a central region that extends between the pair of disc receiving formations that are defined by each disc holder, and a label is affixed to the central region to enable the contents of the discs that are to be positioned in the disc receiving formations to be set out on said label.

15. The system of claim 1 wherein the front side wall has a pair of left and right end portions located near where the front side wall joins with the left and right side walls, respectively, with the left and right end portions being of a common height that is substantially the same height as the left and right side walls, and a portion of the front wall that extends between the left and right end portions is of a substantially lesser height than is the common height.

16. The system of claim 15 wherein a label is affixed to at least a selected one of the left and right end portions of the front wall to enable the contents of the discs that are carried in the tray to be labeled on the front of the tray.

17. The system of claim 15 wherein the left, right and rear side walls, and the left and right end portions of the front wall 1) all are of a common height that is higher than the tallest height to which any portion of the hook-shaped guide members extend, and 2) extend contiguously and without interruption from the left end portion of the front wall, thence along the left side wall, thence along the rear side wall, thence along the right side wall to the right end portion of the front wall such that a contiguous upper edge of uniform height is defined thereby.

18. The system of claim 17 including a cover that is configured to be positioned atop said contiguous upper edge for overlying the tray.

19. The system of claim 18 wherein the cover is hinge-connected to a selected one of the upstanding side walls of the tray.

20. The system of claim 19 wherein the selected one of the upstanding side walls to which the cover is hinge-connected is a selected one of the left and right side walls.

21. The system of claim 19 wherein the selected one of the upstanding side walls to which the cover is hinge-connected is the rear side wall.

22. The system of claim 1 additionally including a cover that is hinge-connected to the tray for selectively closing and providing access to the interior of the upwardly opening tray.

23. The system of claim 17 wherein junctures between adjacent ones of the upstanding side walls are defined by four smoothly curved corner formations that smoothly join with the adjacent side walls.

24. The system of claim 17 wherein the upstanding side walls taper slightly outwardly away from the center of the tray as the side walls extend upwardly from the bottom wall.

25. The system of claim 20 wherein the slight outward taper of the upstanding side walls the tray and an additional tray of identical configuration to be stacked one atop another with said contiguous upper edge of the lowermost of the two stacked trays to engage regions of juncture of the upstanding side walls and the bottom wall of the uppermost of the two stacked trays.

* * * * *